Patented May 16, 1933

1,908,951

UNITED STATES PATENT OFFICE

EDGAR C. BRITTON AND RAY D. HOLMES, OF MIDLAND, MICHIGAN, ASSIGNORS TO THE DOW CHEMICAL COMPANY, OF MIDLAND, MICHIGAN, A CORPORATION OF MICHIGAN

METHOD OF SEPARATING ALKYL ANILINES

No Drawing.   Application filed September 23, 1927. Serial No. 221,612.

As prepared by the usual methods, the dialkylated aniline derivatives, such as dimethyl aniline, diethyl aniline, dimethyl p-toluidine, dimethyl p-phenylene diamine, etc. contain also some mono-alkylated aniline derivative. These mono-alkylated derivatives although not detrimental in all usages in which the dialkyl anilines are employed in the arts, are, however, harmful in some cases, and must be removed for such usage. For instance, if mono-methyl aniline be present in dimethyl aniline to the extent of over 1%, the preparation of nitroso dimethyl aniline therefrom is unsatisfactory due to the presence in the product of N-nitroso methyl aniline; and such raw material is unsuitable for this purpose unless in some manner purified.

Several methods have been proposed and used for this purification, but none capable of yielding a pure product without the use of expensive reagents or costly procedure. A process for the separation of dialkyl aniline and mono-alkyl aniline. for purifying either, is accordingly highly desirable.

To the accomplishment of the foregoing and related ends, the invention, then, consists of the features hereinafter fully described, and particularly pointed out in the claims, the following description setting forth in detail certain procedure in the application of the invention, such being illustrative however, of but a few of the various ways in which the principle of the invention may be employed.

In accordance with our invention, the alkyl anilines to be separated are heated with phthalic anhydride. This reacts with mono-alkyl aniline to form mono-N-alkyl-phthalanilic acid, as may be represented in the following equation:

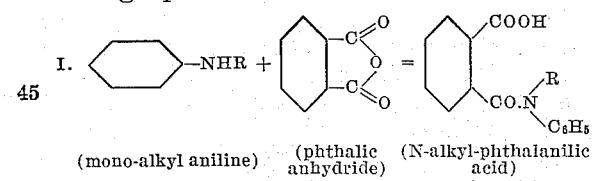

(mono-alkyl aniline)  (phthalic anhydride)  (N-alkyl-phthalanilic acid)

The resulting acid may be readily separated from the unreacted dialkyl aniline in various ways, as will be described more in detail. A small amount of di-N-alkyl-phthalanilide may also form, but this compound is easily separated from the dialkyl aniline by distillation. The following equation represents the reaction for the di compound:

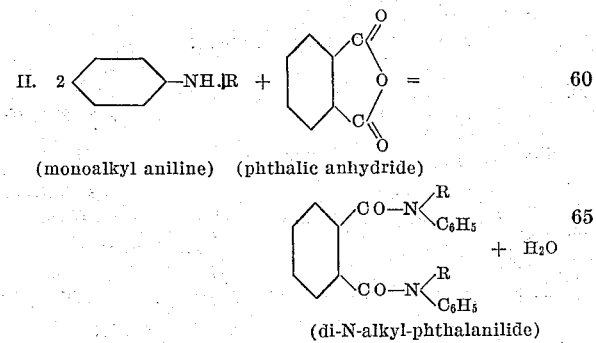

(monoalkyl aniline)   (phthalic anhydride)

(di-N-alkyl-phthalanilide)

These mono-N-alkyl-phthalanilic acids are generally syrupy liquids which are difficult to obtain in pure form, becoming waxy on cooling. Having a free carboxyl group present, they can, however, be separated from the di-ethyl aniline by forming their alkali metal salts, the following equation illustrating the reaction where caustic soda is thus used:

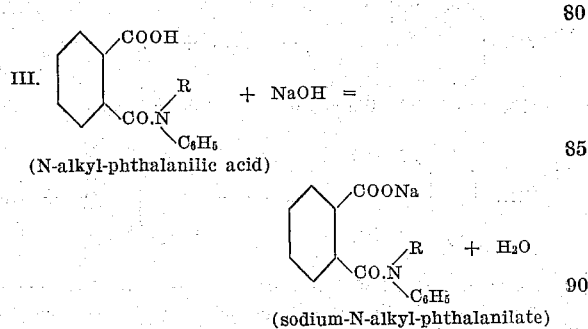

(N-alkyl-phthalanilic acid)

(sodium-N-alkyl-phthalanilate)

These phthalanilate salts are soluble in water and insoluble in the dialkyl anilines, and this characteristic affords one method of separation. The dialkyl anilines have, further, a very much lower boiling point than the phthalic acid derivative mentioned, and may be easily and completely separated by distillation without washing out the mono- N-alkyl-phthalanilic acid. This characteristic affords a second method of separating. Or, if it is desired, the dialkyl aniline may be steam distilled from the phthalic acid derivative. In any of these procedures of separating the dialkyl aniline from the phthalic acid derivative, a pure dialkyl aniline is produced.

In addition to the above mentioned procedures which may be practiced, further treatment of the phthalic acid derivative may be carried out for the purpose of producing pure monoalkyl aniline, as well as for recovering the phthalic anhydride. The N-alkyl-phthalanilic acids may be hydrolyzed readily by aqueous acid, or alkali solutions using heat under pressure, producing the monoalkyl aniline which may be recovered pure and the phthalic acid which may be returned to the process for reuse. The following equations of the reactions involved are:

First using alkali solution:

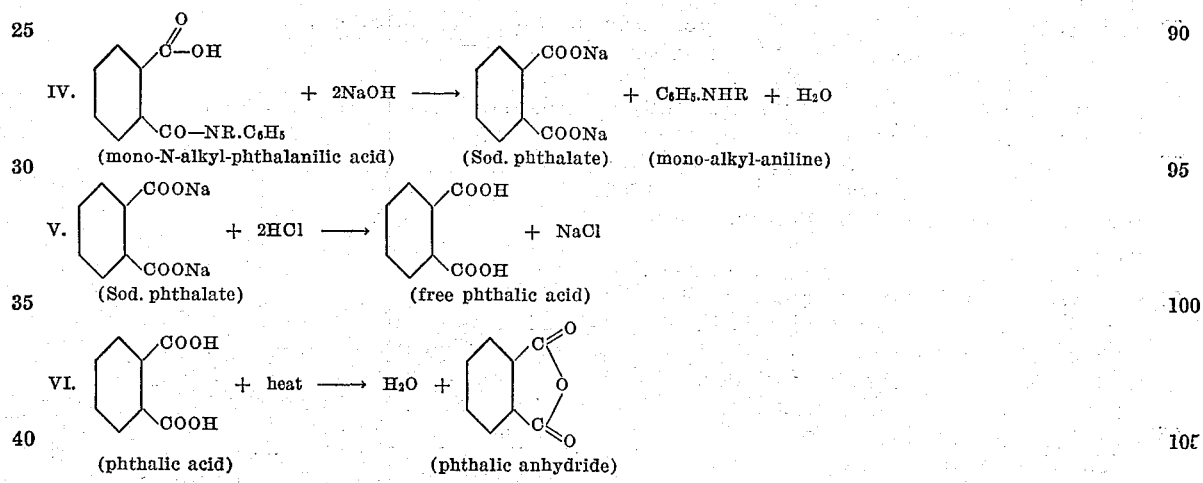

Second, using acid solution:—

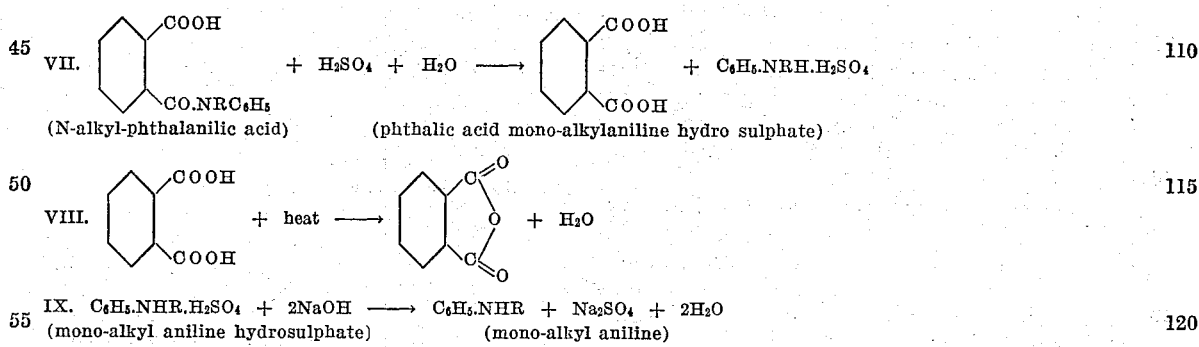

These two methods of hydrolysis of the N-alkyl-phthalanilic acid may be practised as seems advisable. The acid hydrolysis can be carried out with quite dilute acid, or desirably with 50% sulphuric acid very readily at about 100° C.

In all of the foregoing equations, it will be understood that "R" represents an alkyl group.

As illustrative examples showing possible proportions, the following may be noted:

(1) 300 g. by weight of dimethyl aniline containing 1.2% of mono-methyl aniline were heated for about four hours at a temperature around 100° C. with 7 g. of phthalic anhydride. By direct distillation under reduced pressure, 288 g. of dimethyl aniline having a F. P. of 2.24° C. were recovered.

(2) Steam distill the residue from Example 1 until all di-methyl aniline is removed. Then add 25 cc. 50% sulphuric acid and heat to 100° C. Dilute with 25 cc. water and filter off phthalic acid. Treat filtrate with 50 cc. 30% caustic soda solution and steam distill out the mono-methyl aniline.

(3) 300 g. of dimethyl aniline containing 1.2% of mono-methyl aniline were heated for about four hours at a temperature of around 100° C. with 10 g. of phthalic anhydride. After reaction, the dimethyl aniline was washed with 44 cc. of 10% caustic soda solution, following which the mass was allowed to stratify, and the oily layer distilled under reduced pressure, about 280 g. of dimethyl aniline being obtained. The alkaline solution or layer was then steam distilled to drive off occluded dimethyl aniline, giving 10 g. oil F. P. of 2° C. after being dried over anhydrous sodium sulphate. This alkaline solution was then heated under pressure at around 180° C. for about four hours and 3 g.

of mono-methyl aniline were obtained. Upon acidification 9 g. of phthalic acid were recovered.

(4) 100 g. of diethyl aniline, freezing point of −37.8° C. were heated at 135° to 140° C. for four hours with 3.1 g. of phthalic anhydride. At the end of the period of heating one-half of the reaction mixture was distilled direct, and gave a diethyl aniline having a freezing point of −36° C., the other half was washed with a 10% caustic soda solution and then was distilled giving a diethyl aniline having a freezing point of −35.6° C.

From the foregoing description, it will be seen that the process is readily adapted for separating di-alkyl aniline from mono-alkyl aniline, or vice versa, in order to make either the pure mono or di compound; i. e. the process may be regarded as one for purifying either such compound by removing the other. The process is, moreover, inexpensive to carry out, and while easy to apply, it is nevertheless capable of producing these mono and di-alkyl anilines in a state of greater purity than heretofore attained by any method of which we have knowledge.

Other acid anhydrides in addition to phthalic anhydride, for example succinic anhydride, have the characteristic of reacting with a mono-alkyl aniline to form an acid corresponding with mono-N-alkyl-phthalanilic acid, and so may be utilized in the manner hereinbefore set forth for effecting the separation of such mono-alkyl aniline from di-alkyl-aniline.

Other modes of applying the principle of the invention may be employed, change being made as regards the details disclosed, provided the steps stated in any of the following claims, or the equivalent of such steps, be employed.

We therefore particularly point out and distinctly claim as our invention:

1. A process of separating N-monoalkyl and N-dialkyl aromatic amines of the benzene series from a mixture thereof which comprises reacting the N-monoalkyl aromatic amine with a dicarboxylic acid anhydride at a temperature below approximately 140° C., in the absence of a solvent, and separating unreacted N-dialkyl amine from the reaction mixture.

2. A process of separating N-monoalkyl and N-dialkyl aromatic amines of the benzene series from a mixture thereof which comprises reacting the N-monoalkyl aromatic amine with a dicarboxylic acid anhydride at a temperature below approximately 140° C., in the absence of a solvent, and distilling unreacted N-dialkyl amine from the reaction mixture.

3. A process of separating N-monoalkyl and N-dialkyl aromatic amines of the benzene series from a mixture thereof which comprises reacting the N-monoalkyl aromatic amine with a dicarboxylic acid anhydride at a temperature below approximately 140° C., in the absence of a solvent, distilling unreacted N-dialkyl amine from the reaction mixture under sub-atmospheric pressure, hydrolyzing the residue through heating the same with aqueous caustic alkali, and separating the N-monoalkyl aromatic amine from the hydrolysis mixture.

4. A process of separating N-monoalkyl and N-dialkyl anilines from a mixture thereof which comprises reacting the N-monoalkyl aniline with phthalic anhydride at a temperature below approximately 140° C., in the absence of a solvent, and separating unreacted N-dialkyl aniline from the reaction mixture.

5. A process of separating N-monoalkyl and N-dialkyl anilines from a mixture thereof which comprises reacting the N-monoalkyl aniline with phthalic anhydride at a temperature below approximately 140° C., in the absence of a solvent, and distilling unreacted N-dialkyl aniline from the reaction mixture.

6. A process of separating N-monoalkyl and N-dialkyl anilines from a mixture thereof which comprises reacting the N-monoalkyl aniline with phthalic anhydride at a temperature below approximately 140° C., in the absence of a solvent, distilling unreacted N-dialkyl aniline from the reaction mixture under subatmospheric pressure, hydrolyzing the residue with aqueous caustic alkali, and separating the N-monoalkyl aniline from the hydrolysis mixture.

7. A process of separating N-monoalkyl and N-dialkyl anilines from a mixture thereof which comprises reacting the N-monoalkyl aniline with phthalic anhydride at a temperature below approximately 140° C., in the absence of a solvent, distilling unreacted N-dialkyl aniline from the reaction mixture, hydrolyzing N-alkyl-phthalanilic acid in the residue with aqueous caustic alkali to form N-alkyl aniline therefrom, and recovering the latter.

8. A process of separating N-methyl and N-dimethyl anilines from a mixture thereof which comprises reacting the N-methyl aniline with phthalic anhydride at a temperature below approximately 100° C., in the absence of a solvent, and separating unreacted N-dimethyl aniline from the reaction mixture.

9. A process of separating N-methyl and N-dimethyl anilines from a mixture thereof which comprises reacting the N-methyl aniline with phthalic anhydride at a temperature below approximately 100° C., in the absence of a solvent, and distilling unreacted N-dimethyl aniline from the reaction mixture.

10. A process of separating N-methyl and N-dimethyl anilines from a mixture thereof which comprises reacting the N-methyl aniline with phthalic anhydride at a temperature below approximately 100° C., in the absence of a solvent, distilling unreacted N-dimethyl aniline from the reaction mixture under sub-atmospheric pressure, hydrolyzing the residue through heating the same with aqueous caustic alkali, and separating N-methyl aniline from the hydrolysis mixture.

11. A process of separating N-methyl and N-dimethyl anilines from a mixture thereof which comprises reacting the N-methyl aniline with phthalic anhydride in the absence of a solvent, distilling unreacted N-dimethyl aniline from the reaction mixture, hydrolyzing N-methyl-phthalanilic acid in the residue with aqueous caustic alkali to form N-methyl aniline therefrom, and recovering the latter.

12. A process of separating N-ethyl and N-diethyl anilines from a mixture thereof which comprises reacting the N-ethyl aniline with phthalic anhydride at a temperature below approximately 140° C., in the absence of a solvent, and separating unreacted N-diethyl aniline from the reaction mixture.

13. A process of separating N-ethyl and N-diethyl anilines from a mixture thereof which comprises reacting the N-ethyl aniline with phthalic anhydride at a temperature below approximately 140° C., in the absence of a solvent, and distilling unreacted N-diethyl aniline from the reaction mixture.

14. A process of separating N-ethyl and N-diethyl anilines from a mixture thereof which comprises reacting the N-ethyl aniline with phthalic anhydride at a temperature below approximately 140° C., in the absence of a solvent, distilling unreacted N-diethyl aniline from the reaction mixture under reduced pressure, hydrolyzing the residue through heating the same with caustic alkali, and separating N-ethyl aniline from the hydrolysis mixture.

15. A process of separating N-ethyl and N-diethyl anilines from a mixture thereof which comprises reacting the N-ethyl aniline with phthalic anhydride in the absence of a solvent, distilling unreacted N-diethyl aniline from the reaction mixture, hydrolyzing N-ethyl-phthalanilic acid in the residue with aqueous caustic alkali to form N-ethyl aniline therefrom, and recovering the latter.

16. In a process for separating N-monoalkyl and N-dialkyl aromatic amines of the benzene series from a mixture thereof, the steps which consist in hydrolyzing a N-monoalkyl phthalanilic acid through heating the same under super-atmospheric pressure with aqueous caustic alkali, and separating the N-monoalkyl aniline, so liberated, from the hydrolysis mixture.

Signed by us this 13th day of September, 1927.

EDGAR C. BRITTON.
RAY D. HOLMES.